United States Patent [19]

Fukuda

[11] 4,088,009
[45] May 9, 1978

[54] AIR MICROMETER

[76] Inventor: Akira Fukuda, 2-22-8 Kasuga-cho, Nerima-ku, Tokyo, Japan

[21] Appl. No.: 678,289

[22] Filed: Apr. 19, 1976

Related U.S. Application Data

[63] Continuation-in-part of Ser. No. 476,170, Jun. 4, 1974, abandoned.

[30] Foreign Application Priority Data

Jun. 9, 1973  Japan .................................. 48/65193

[51] Int. Cl.² ............................................. G01B 13/10
[52] U.S. Cl. ...................................... 73/4 R; 73/37.8; 73/37.9
[58] Field of Search ........................ 73/4 R, 37.5, 37.8, 73/37.9

[56] References Cited

U.S. PATENT DOCUMENTS

| 2,266,566 | 12/1941 | Poole | 73/37.5 |
| 2,795,855 | 6/1957 | Worthen | 73/37.5 |
| 3,006,183 | 10/1961 | Baker | 73/37.9 |
| 3,477,276 | 11/1969 | Fortier | 73/37.5 |

FOREIGN PATENT DOCUMENTS

| 280,223 | 1/1952 | Switzerland | 73/37.5 |

Primary Examiner—Richard E. Aegerter
Assistant Examiner—Richard R. Stearns
Attorney, Agent, or Firm—William Anthony Drucker

[57] ABSTRACT

A comparison-type air micrometer having a differential pressure transducer has first and second subbranch pipe lines extending respectively to a standard gauge and a workpiece. Due to activation of an output correction circuit connected to an amplifier for the transducer output, measurement errors can be minimized and zero adjustment becomes easy.

1 Claim, 2 Drawing Figures

AIR MICROMETER

This application is a continuation-in-part of my prior copending application Ser. No. 476,170, now abandoned, filed June 4, 1974.

This invention relates to comparison-type air micrometers for the precision measurement of dimensions of workpieces by using standards for such workpieces.

It is an object of this invention to provide means to make zero adjustment of the indicator as well as adjustment of magnification easy.

It is another object of this invention to provide means to minimize measurement errors due to unexpected changes in piping element constants in the measurement apparatus.

It is a further object of this invention to provide means to make the above-mentioned measurement of dimensions accurately and rapidly.

Still further objects and merits of this invention will become apparent from the following description taken in connection with the accompanying drawings in which.

Figure 1:
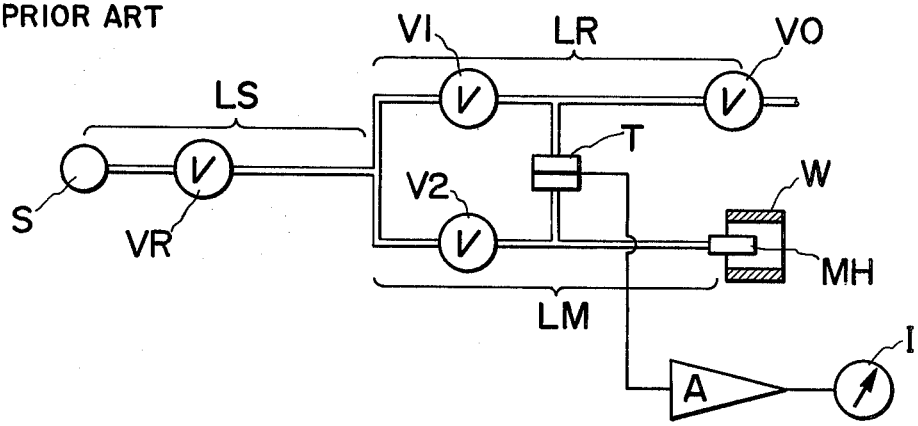
FIG. 1 is a schematic connection diagram of a conventional comparison-type air micrometer in a measurement operation.

In FIG. 1, in which is shown a known differential pressure comparison-type air micrometer, S is a suitable air pressure source such as an air compressor supplying a substantially constant air pressure. An end of main pipe line LS which has a reducing valve VR inserted therein is connected to said air pressure source S. Another end of main pipe line LS branches off to a first branch pipe line LR and a second branch pipe line LM. First branch pipe line LR extends through a first adjustable orifice valve V1 and a zero adjusting valve V0 to outer air. Second branch pipe line LM extends through a second adjustable orifice valve V2 to a measurement head MH which is to be applied to a workpiece to be measured or examined. At the outlet side of first orifice valve V1, first branch pipe line LR branches off to an inlet or a differential pressure transducer T. And, at the outlet side of second orifice valve V2, second branch pipe line LM branches off to another inlet of transducer T. The output terminal of transducer T is connected to the input terminal of a direct current amplifier A. Thus, a differential pressure between first and second branch pipe lines LR and LM at the outlet sides respectively of first and second orifice valves V1 and V2 is to be converted into an electric output so as to be indicated by indicator I through the medium of amplifier A. It is to be understood that the figure is shown in a measurement operation in which measurement head MH is being introduced in a workpiece W which is a pipe, the inside diameter of which pipe is to be measured.

In a known comparison-type air micrometer such as stated above, notable drawbacks such that measurement errors are caused by dust, oils and fats, moisture or other minute obstacles sticking to orifice valves V1 and V2 or zero adjusting valve V0, or by a change in zero adjusting valve V0 opening have been experienced. And, it is another and also a notable drawback of a known comparison-type air micrometer that in using such an air micrometer, zero adjustment is very difficult upon measurement at a high magnification.

In accordance with this invention, the above-noted drawbacks have been eliminated. Hereunder will be stated this invention fully by reference particularly to FIG. 2 which is shown in an embodiment of this invention.

According to this invention, there is provided principally a foregoing conventional air micrometer. And, in said conventional air micrometer, there is provided a said second branch pipe line shown at LM1 which branches off to a first subbranch pipe line LN and a second subbranch pipe line LW. Hereunder, "pipe line" or "pipe lines" will be expressed respectively by "line" or "lines" for simplicity. First subbranch line LN extends through a first stop valve SV1 to a standard measuring head NH which is to be applied to a master gauge G. Second subbranch line LW extends through a second stop valve SV2 to measurement head WH which is to be applied to a workpiece W to be measured. An electric circuit CE enclosed by a chain line and connected to amplifier A is a circuit which is to correct the output of amplifier A in such a manner that said circuit CE will impede the output of amplifier A which has been a stable output prior to starting actual operations for measuring a workpiece, but will let said amplifier output caused upon starting said actual measuring operations pass.

And, according to this invention, there is provided also first and second output terminals OUT-1 and OUT-2 and a change over switch SW1 for changing the input terminal of indicator I over said output terminals OUT-1 and OUT-2. Said first and second output terminals OUT-1 and OUT-2 are provided respectively for the supplying of outputs derived from said amplifier A. And, first output terminal OUT-1 is for a relatively small output value, and second output terminal OUT-2 is for a relatively large output value. An intermediate circuit for deriving said outputs from amplifier A to output terminals OUT-1 and OUT-2 can be designed in several manners in association with or in respect of said output correction circuit CE.

Figure 2:
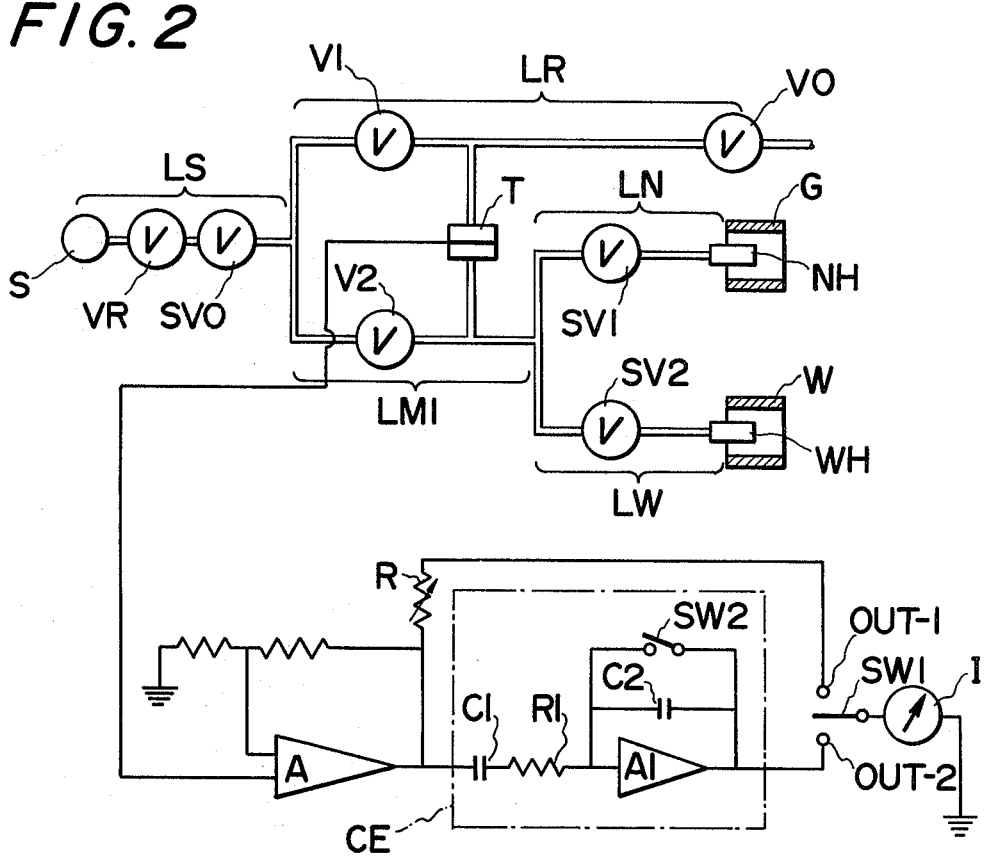
FIG. 2 is a schematic connection diagram of an embodiment of this invention in a measurement operation.

In an embodiment of this invention as shown in FIG. 2, said output correction circuit CE includes a differentiation circuit and an integration circuit connected to said differentiation circuit. Said differentiation circuit includes a capacitor C1 and a resistor R1, and said integration circuit includes an amplifier A1. The input terminal of said differentiation circuit is connected to the output terminal of said amplifier A, and the output terminal of said integration circuit is connected to said second output terminal OUT-2. On the other hand, the output terminal of amplifier A is connected through an adjusting resistor R to said first output terminal OUT-1. Thus, by means of adjusting resistor R and amplification of amplifier A, a relatively small output value which has been derived from amplifier A is supplied to first output terminal OUT-1 and a relatively large output value is supplied through said circuit CE to the second output terminal OUT-2.

An output correction circuit CE other than the foregoing circuit may be designed by means of providing a suitable circuit, for example a reset circuit receiving output of said amplifier A and by means of which an output of a polarity opposite to said output of amplifier A and of a value in proportion thereto is fed back to said amplifier A.

Further, in FIG. 2, standard measuring head NH and measurement head WH are illustrated as being introduced respectively in a pipe for a master gauge G and a pipe for the workpiece W for the measurement of the inside diameter of said workpiece W. And, however indicator I is illustrated as having a conventional pointer, it can also be replaced by a meter relay so as thereby to effect indications of pass and reject against workpieces to be examined.

Zero Adjustment and Adjustment of Magnification of Indicator

Hereunder will be stated the use of an air micrometer according to this invention. First, zero adjustment of indicator I is required. A standard master gauge G is applied to standard measuring head NH. And, a master gauge for adjusting magnification in place of workpiece W shown in the figure is applied to measurement head WH. The electric circuits are connected to an electric source for the operation. And, air pressure which is to be supplied from air pressure source S is adjusted by means of reducing valve VR to a predetermined value. Indicator I is connected to first output terminal OUT-1 by means of switch SW1. Then, an adjustment operation for zero adjustment of indicator I is effected by opening first stop valve SV1 and regulating zero adjusting valve V0 and orifice valve V2. It is not required that the zero adjustment is effected strictly, but adjusting the indicator so that its pointer indicates about zero is sufficient.

It is assumed herein that workpieces to be measured are pipes, and values of inside diameter thereof to pass an examination are from 10.00 mm to 10.01 mm. It is also assumed that by means of adjusting variable resistor R, the output value at second output terminal OUT-2 is five times an output value at first output terminal OUT-1. The inside diameter of said standard master gauge and inside diameter of the master gauge for adjusting magnification are assumed respectively to be 10.00±0 mm and 10.02 mm. Hereupon, the amplification of amplifier A is regulated so that an indication of indicator I connected to first output terminal OUT-1, which indication corresponds to said master gauge for adjusting magnification, will point +10.

Measurement of Workpieces

Firt, said master gauge for adjusting magnification is removed from measurement head WH and replaced by a workpiece W to be examined. Then, first stop valve SV1 is opened so as to measure the standard master gauge G for checking the zero point of indicator I upon actual measuring operation of workpiece W. Indicator I stands connected to first output terminal OUT-1. Hereupon, indicator I will indicate a value of about zero due to the foregoing zero adjustment. However, as stated in the foregoing and particularly in a case in which actual measuring operations are effected after a relatively long interval of time since said zero adjustment of indicator I was done, there may be often a case in which the indication of indicator I is found to be far off from zero. Such a dislocation in indication may be caused by dust, oils and fats, or moisture sticking to pipe line elements such as orifice valves V1 and V2, and zero adjusting valve V0. In such a case, main pipe line LS is closed by an electromagnetic valve SV0 which is inserted in said line LS so as to discontinue the measurement operation and effect an inspection and cleaning of pipe lines and elements. Closure and opening of said electromagnetic valve SV0 may be made by means of a meter relay connected previously in parallel with indicator I. And, if the dislocation of indication is within a range as stated in the following, measurement of workpiece is effected.

To effect measurement of workpiece W, indicator I is connected to second output terminal OUT-2 by changing switch SW1 over, and the integration circuit of output correction circuit CE is activated by means of opening switch SW2. First stop valve SV1 is closed and second stop valve SV2 is opened. Because an indication of indicator I which corresponds to said master gauge for adjusting magnification of inside diameter of 10.02 mm was +10 on the scale of indicator I and another indication of indicator I which corresponds to said standad master gauge G was zero as noted previously, an indication which corresponds to an inside diameter of 10.01 mm which value herein is the upper limit of allowance of a workpiece W to pass the examination will be +5 on the scale. Accordingly, in the examination of workpiece, a workpiece can be graded to a pass if the indication lies within a range of from 0 to +5 on the scale, and it can be graded to a reject if the indication lies off said range. It can easily be seen from the above that said pass and reject grades can be indicated digitally by means of a meter relay noted in the foregoing.

And, if there happened prior to such measurement operations a small amount of dislocation in indication of said indicator due to obstacles in the pipe line elements, such a dislocation will not cause measurement errors by the action of output correction circuit CE as stated below. According to an embodiment as shown in the figure, circuit CE, prior to opening of switch SW2 in the actual measuring operations of workpiece W, contains only a differentiation circuit which consists of a capacitor C1 and a resistor R1 connected in series. So, capacitor C1 is charged with an output caused at the output terminal of amplifier A upon obstacles being caused in the pipe lines. However, such a charge in capacitor C1 will not be discharged even if the integration circuit is activated upon opening of switch SW2, and said amplifier output will not be detected by indicator I. On the contrary, the initial surge of an output caused by workpiece W, upon opening stop valve SV2 in said actual measuring operations, will add a new charge on the above-mentioned charge in capacitor C1 caused by said obstacles in the pipe lines and passes said differentiation circuit so as to be held by said integration circuit for being detected by indicator I as a stable output in appearance. As the result, an output of transducer T caused by obstacles prior to actual measuring operations is eliminated in appearance and only an output of transducer T caused by workpiece W can be detected.

As stated above, according to this invention, an air micrometer having a large reliability can be afforded. This reliability is based on correctness of measured values due to elimination of measurement errors in the measurement of workpieces upon a small change being caused in the orifice valves and the zero adjusting valve by the presence of dust, oils and fats, or moisture sticking to pipe line elements or by a shock imposed on said pipe line elements. And, according to this invention, zero adjustment by means of a standard master gauge and regulation of indication range of the indicator by means of a master gauge for regulating magnification are effected under a sensibility lower than that in an operation of measurement of workpieces. Accordingly, it is not required that such adjustments and regulations are to be effected strictly. This causes measurement to be performed very easily. Further, in accordance with this invention, means to discontinue measurement operations automatically upon occurrence of a trouble which will cause a large amount of dislocation in indication passing over a predetermined indication range can be afforded by means of a meter relay which may be connected in parallel with or in place of the indicator. It will be apparent from the above, that this invention can easily be modified so as to provide an automatic means for the examination of workpieces.

Having thus described my invention, what is claimed for Letters Patent is:

1. In an air micrometer including a main pipe line having an end connected to an air pressure source and another end branching off to a first branch pipe line and a second branch pipe line, said first branch pipe line extending through a first adjustable orifice valve and a zero adjusting valve to outer air, said second branch pipe line extending through a second adjustable orifice valve to a measurement head, said first branch pipe line branching off at the outlet side of said first orifice valve to an inlet of a differential pressure transducer and connecting thereto, said second branch pipe line branching off at the outlet side of said second orifice valve to another inlet of said transducer and connecting thereto, the output terminal of said transducer being connected to the input terminal of a direct current amplifier for the indication of differential pressure between outlet sides of said first and second orifice valves; the improvement which comprises said second branch pipe line second orifice valve outlet side branching off to first and second subbranch pipe lines, said first subbranch pipe line extending through a first stop valve to a standard measuring head to be applied to a standard gauge, said second subbranch pipe line extending through a second stop valve to said measurement head to be applied to a workpiece to be measured, an output correction circuit connected to said amplifier, first and second output terminals, and a changeover switch for selectively connecting said first and second output terminals to the input terminal of an indicator, said first output terminal being connected through a variable resistor to said amplifier output terminal, and said second output terminal being connected to said output correction circuit output terminal, said output correction circuit including a circuit means for eliminating said amplifier output, a circuit means for passing said amplifier output through said output correction circuit, and a switch means for selectively connecting said former and latter circuit means between said amplifier output terminal and said second output terminal, said circuit for eliminating said amplifier output is a differentiation circuit, said circuit for passing said amplifier output is said differentiation circuit and an integration circuit connected in series, and said switch means for selectively connecting said former and latter circuits is connected in parallel to said integration circuit.

* * * * *